(12) United States Patent
Lee et al.

(10) Patent No.: US 8,551,226 B2
(45) Date of Patent: Oct. 8, 2013

(54) EXHAUST GAS TREATING SYSTEM USING POLYMER MEMBRANE FOR CARBON DIOXIDE CAPTURE PROCESS

(75) Inventors: Hyung-Keun Lee, Daejeon (KR); Won-Kil Choi, Daejeon (KR); Hang-Dae Jo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 7 days.

(21) Appl. No.: 13/452,055

(22) Filed: Apr. 20, 2012

(65) Prior Publication Data

US 2013/0098246 A1    Apr. 25, 2013

(30) Foreign Application Priority Data

Apr. 22, 2011   (KR) .................. 10-2011-0037784

(51) Int. Cl.
*B01D 53/22*   (2006.01)
(52) U.S. Cl.
USPC .............. 96/9; 95/43; 95/45; 95/47; 95/49; 96/7; 96/10
(58) Field of Classification Search
USPC ................ 95/43, 45, 47, 49; 96/7, 9, 10
See application file for complete search history.

(56) References Cited

U.S. PATENT DOCUMENTS

| | | | | |
|---|---|---|---|---|
| 3,702,658 A * | 11/1972 | Mcnamara | ............. | 210/321.8 |
| 3,930,814 A * | 1/1976 | Gessner | .............. | 95/19 |
| 3,976,451 A * | 8/1976 | Blackmer et al. | ............. | 96/7 |
| 6,416,568 B1 * | 7/2002 | Wallace et al. | ............. | 95/55 |
| 7,827,778 B2 * | 11/2010 | Finkenrath et al. | ............. | 60/39.52 |
| 7,964,020 B2 * | 6/2011 | Baker et al. | .............. | 95/51 |
| 2010/0172813 A1 * | 7/2010 | Nazarko et al. | ............. | 423/232 |
| 2010/0263377 A1 * | 10/2010 | Meulenberg et al. | ............. | 60/645 |
| 2011/0014683 A1 * | 1/2011 | Vermaas et al. | ............. | 435/252.1 |
| 2011/0182797 A1 * | 7/2011 | Wilcox | ............. | 423/359 |
| 2012/0055385 A1 * | 3/2012 | Lien et al. | ............. | 110/345 |
| 2012/0111192 A1 * | 5/2012 | Nazarko et al. | ............. | 95/51 |

OTHER PUBLICATIONS

Weichart, J. and Müller, J., "Investigation of the concentration driven permeation of diluted $SO_2$, $NO_2$, and CO in silicon organic membranes prepared by plasma polymerization," *Journal of Membrane Science*, 86:87-93, Elsevier Science B.V., Amsterdam (1994).

* cited by examiner

*Primary Examiner* — Jason M Greene
*Assistant Examiner* — Anthony Shumate
(74) *Attorney, Agent, or Firm* — Sterne, Kessler, Goldstein & Fox P.L.L.C.

(57) ABSTRACT

Disclosed is an exhaust gas treating system having an exhaust gas treating apparatus for carbon dioxide capture process which additionally removes harmful substances remaining in the gas discharged from the existing flue-gas desulfurization process by using separation membrane so as to efficiently carry out the carbon dioxide capture process. The exhaust gas treating system using polymer membrane, comprises a carbon dioxide capture equipment for capturing carbon dioxide from the exhaust gas of a boiler, a flue-gas denitrification equipment placed between the boiler and the carbon dioxide capture equipment, a dust-collecting equipment and a flue-gas desulfurization equipment.

6 Claims, 3 Drawing Sheets

EXHAUST GAS TREATING SYSTEM USING POLYMER MEMBRANE FOR CARBON DIOXIDE CAPTURE PROCESS

CROSS REFERENCE TO RELATED APPLICATIONS

This application claims priority to Korean Patent Application No. 10-2011-0037784, filed on Apr. 22, 2011 in the Korean Intellectual Property Office, the entire disclosure of which is incorporated herein by reference.

BACKGROUND OF THE INVENTION

1. Field of the Invention

The present invention relates an exhaust gas treating system using polymer separation membrane, and more specifically to an exhaust gas treating system having an exhaust gas treating apparatus for carbon dioxide capture process which additionally removes harmful substances remaining in the gas discharged from the existing flue-gas desulfurization process by using separation membrane so as to efficiently carry out the carbon dioxide capture process.

2. Background Art

With an accelerated development of the technology of carbon dioxide capture and storage (hereinafter to be called 'CCS') for reducing the emission of carbon dioxide. Which is a representative greenhouse gas causing global warming, the level of carbon dioxide capture technologies has become high enough for commercialization. However, the development of the technology of treating harmful substances in the exhaust gas to be supplied to carbon dioxide capture process, which is indispensable for maintaining the performance of the carbon dioxide capture process and ensuring the durability of the process, is still unsatisfactory.

Coal, which has come to the fore as fossil fuel that has to be used more than any other fuels on a long-term basis, emits a lot of carbon dioxide due to its high carbon/hydrogen ratio and contains a relatively large quantity of harmful components such as sulfur. Since a high concentration of harmful components is emitted during combustion, it is essential to treat the harmful gases at the prestage of the carbon dioxide capture process.

FIG. 1 is a block diagram showing the exhaust gas treating system of a conventional coal burning thermal power plant including the carbon dioxide capture process.

With reference to FIG. 1, in the conventional exhaust gas treating system of a coal burning thermal power generation plant, contaminants are removed from the exhaust gas discharged from boiler 110 through flue-gas denitrification equipment 120, dust-collecting equipment 130 and flue-gas desulfurization equipment 140, before carbon dioxide is captured through carbon dioxide capture equipment 150 to be compressed and stored, and the exhaust gas is discharged into the atmosphere through a chimney 160.

As shown in FIG. 1, in the case of the conventional exhaust gas treating system of a coal burning thermal power plant, most of them are equipped with flue-gas desulfurization equipment 140 and flue-gas denitrification equipment 120, so about 90% of sulfur oxide (SOx) and nitrogen oxide (NOx) contained in the exhaust gas is removed before it is discharged.

However, even after the exhaust gas has passed through the desulfurization equipment 140 and denitrification equipment 120, the exhaust gas contains about 50 ppm to 100 ppm of SOx and NOx. If the exhaust gas containing sulfur oxide (SOx) and nitrogen oxide (NOx) which contain about 5% of nitrogen dioxide ($NO_2$) is introduced into a carbon dioxide ($CO_2$) capture process, the operation efficiency and economic effectiveness decrease due to degradation by an absorbent, especially an amine based absorbent or an alkali absorbent, used in the carbon dioxide ($CO_2$) capture process.

In the conventional coal-burning thermal power plant, usually a selective catalyst reduction (SCR) process is used for the flue-gas denitrification process to treat nitrogen oxides (NOx). At this time, the removal efficiency is determined to comply with the emission standard, and the filling amount of catalyst or the feed of ammonia or urea solution is determined accordingly. At this time, in order to prevent the inflow of nitrogen dioxide ($NO_2$) existing at about 5% in nitrogen oxides, additional apparatuses are necessary.

Coal contains heavy metal components (HAPs) such as mercury, and they are discharged into the atmosphere as vaporized form after combustion process. Thus, various methods such as a catalytic oxidation treatment apparatus, a halogenation treatment apparatus, or an activated carbon absorption tower has been developed to remove them.

in order to apply a $CO_2$ capture process to a coal burning thermal power plant wherein exhaust gases containing various contaminants are discharged, a pretreatment process is required to maintain sulfur dioxide ($SO_2$) below 10 ppm and to remove contaminants. Accordingly, there has been an increasing necessity that the existing flue gas desulfurization process is extensively modified or secondary flue-gas desulfurization equipment is additionally installed.

However, to maintain the concentration of discharged sulfur dioxide ($SO_2$) below 10 ppm by raising the desulfurization efficiency to about 99.5% using the existing flue gas desulfurization process, the physical size of the absorption tower should be increased by a great deal and the packings and interior structure should be completely remodeled.

Also, to increase the circulation rate of the absorbent, basic equipment or apparatus such as a circulating pump should be added or replaced with the one having a large capacity. Therefore, in the case that $CO_2$ capture equipment is to be added to the equipment that was already installed and is in operation, it is impossible to use the existing flue-gas desulfurization equipment by remodeling it and additional secondary flue-gas desulfurization equipment should be introduced.

FIG. 2 is a view showing a comprehensive pollutant exhaust gas treating system with secondary flue-gas desulfurization equipment (250) added to a conventional coal burning thermal power plant. The secondary flue-gas desulfurization equipment (250) is connected to the rear end of the first flue-gas desulfurization equipment (240) identical to the related art.

As shown in FIG. 2, in a conventional exhaust gas treating system 200 of a coal burning power plant, after removing contaminants from the exhausts gas discharged from a boiler 210 through flue-gas denitrification equipment 220, dust-collecting equipment 230 and the first flue-gas desulfurization equipment 240 and the secondary flue-gas desulfurization equipment 250, carbon dioxide is captured through carbon dioxide capture equipment 260, and it is compressed and stored, and the exhaust as is discharged into the atmosphere through a chimney 270.

On the other hand, the secondary flue-gas desulfurization equipment 250 is equipped with a mercury halogenation apparatus 251, a secondary desulfurization and mercury absorption apparatus 252, an ion absorption apparatus 253 and denitrification and absorption equipment 254, and these are connected in series. The denitrification and absorption equipment 254 is connected to the carbon dioxide capture equipment 260.

Since the secondary desulfurization equipment has various parts arranged in series to remove contaminants contained in the gas discharged from the first desulfurization equipment, a wide installation space and high installation cost are necessary. Also, an enormous installation cost is required and the operation cost for the processes also rapidly increases, so there is a problem of overall cost increase.

BRIEF SUMMARY OF THE INVENTION

Therefore, it is an object of the present invention to provide an exhaust gas treating system in which is installed an exhaust gas treating system for carbon dioxide capture process whereby harmful components are additionally reduced for the gases discharged from the flue-gas desulfurization equipment and the installation space can be minimized and installation cost can be reduced.

In order to accomplish the above object, there is provided an exhaust gas treating system using polymer membrane, comprising a carbon dioxide capture equipment for capturing carbon dioxide from the exhaust gas of a boiler, a flue-gas denitrification equipment placed between the boiler and the carbon dioxide capture equipment, a dust-collecting equipment and a flue-gas desulfurization equipment, wherein the carbon dioxide capture equipment includes an exhaust gas treating apparatus for carbon dioxide capture which is installed at the front end thereof, and the exhaust gas treating apparatus for carbon dioxide capture comprises a housing which has a space for exhaust gas to flow and on both sides of which are placed an exhaust gas inlet pipe and an exhaust gas outlet pipe;

negative-pressure chambers which are connected to the housing so as to provide an inner space and isolated space of the housing and in which separation pipes connected to negative-pressure devices are installed; and a plurality of separation membrane modules installed inside the housing so that one end portion or both end portions thereof are connected to the inside of the negative-pressure chamber.

In some embodiments, the negative-pressure chambers are composed of a first negative-pressure chamber for separating sulfur oxides and a second negative-pressure chamber for separating nitrogen oxides, wherein the first negative-pressure chamber and second negative-pressure chamber are placed sequentially with respect to the flow direction of the exhaust gas in the housing, and the first negative-pressure chamber and the second negative-pressure chamber are include a first separation pipe and a second separation pipe to communicate therewith, respectively, and a first separation membrane module and a second separation module communicated respectively with the first negative-pressure chamber and the second negative-pressure chamber have mutually different permeability, so that sulfur oxides and nitrogen oxides are separated sequentially from the exhaust gas passing through the housing.

In some embodiments, the sulfur oxides separated from the first negative-pressure chamber are supplied to a sulfur manufacturing apparatus.

In some embodiments, the nitrogen oxides separated from the second negative-pressure chamber are fed back to the boiler.

In some embodiments, one end portion of the separation membrane module is fixed by a connector installed so as to be communicated with the negative-pressure chamber, and the other end portion of the separation membrane module is fixed to a connector installed on the floor surface of the housing.

In some embodiments, both end portions of the separation membrane module are fixed by connectors installed so as to be communicated with the negative-pressure chamber.

According to the exhaust gas treating system for carbon dioxide capture process according to the present invention, the installation space of desulfurization equipment can be minimized and process cost can be reduced by using an exhaust gas treating apparatus using polymer separation membrane in the process of removing harmful gas components included in the gases introduced into the carbon dioxide capture equipment by providing a secondary exhaust gas treating apparatus, when a carbon dioxide capture process is applied to the exhaust gases discharged from the existing desulfurization equipment.

In addition, by keeping the contaminants contained in the gas introduced in the carbon dioxide capture equipment below a proper level, absorption performance can be improved as degradation of the absorbent used in the carbon dioxide capture process is prevented. After all, it has an advantage of preventing the pollution by the exhaust gas discharged into the atmosphere.

BRIEF DESCRIPTION OF THE FIGURES

The above and other objects, features and other advantages of the present invention will be more clearly understood from the following detailed description taken in conjunction with the accompanying drawings, in which.

DETAILED DESCRIPTION OF THE INVENTION

Hereinafter, some exemplary embodiments of the present invention will be described in detail below with reference to the accompanying drawings.

Figure 1:
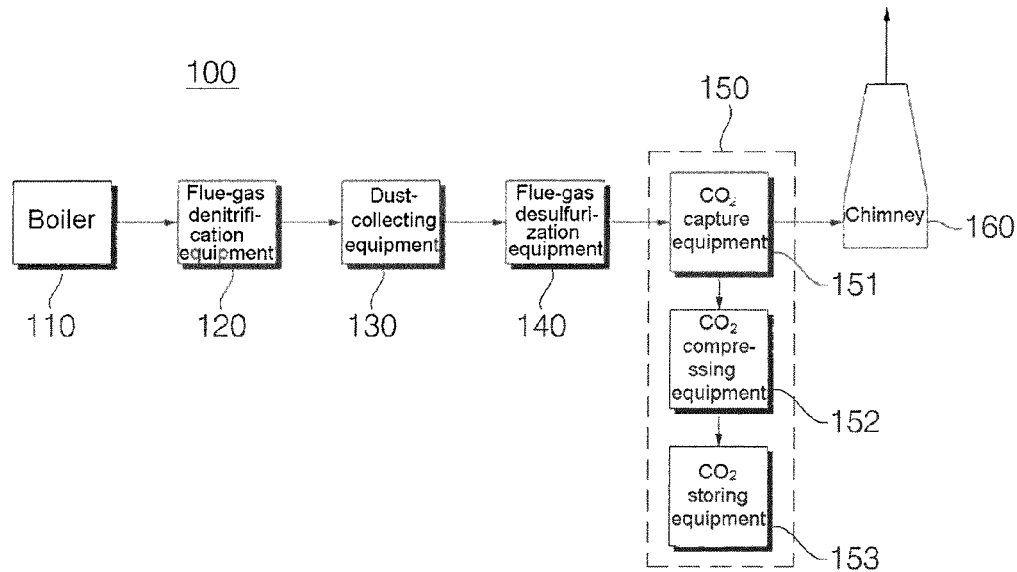
FIG. 1 is a block diagram showing the configuration of an exhaust gas treating system for a conventional coal burning thermal power plant in related art.
Figure 2:
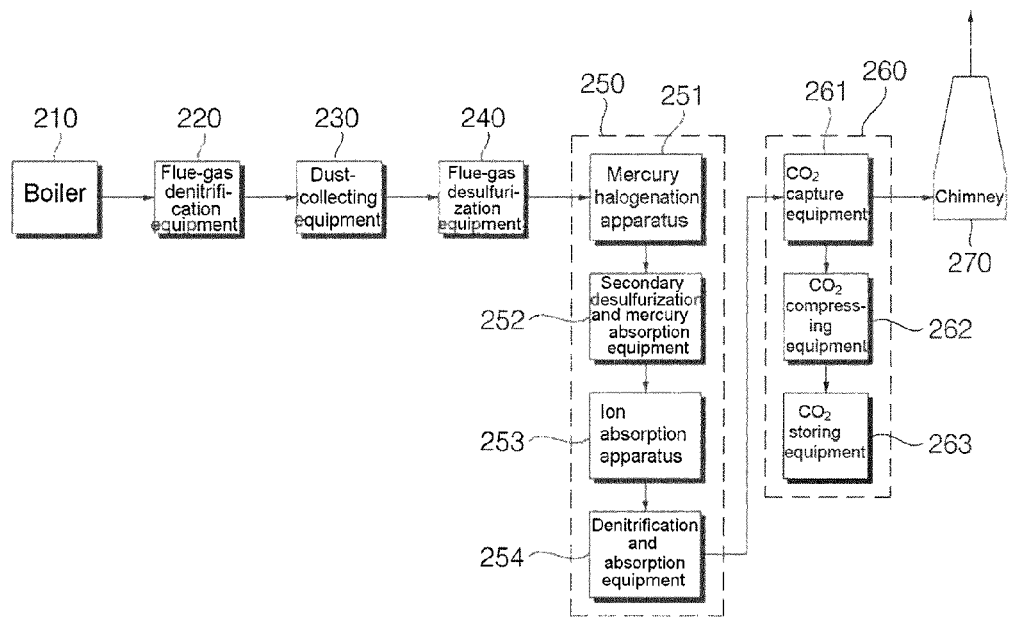
FIG. 2 is a block diagram showing the configuration of an exhaust gas treating system with the secondary flue-gas desulfurization equipment added to the exhaust gas treating system of FIG. 1.
Figure 3:
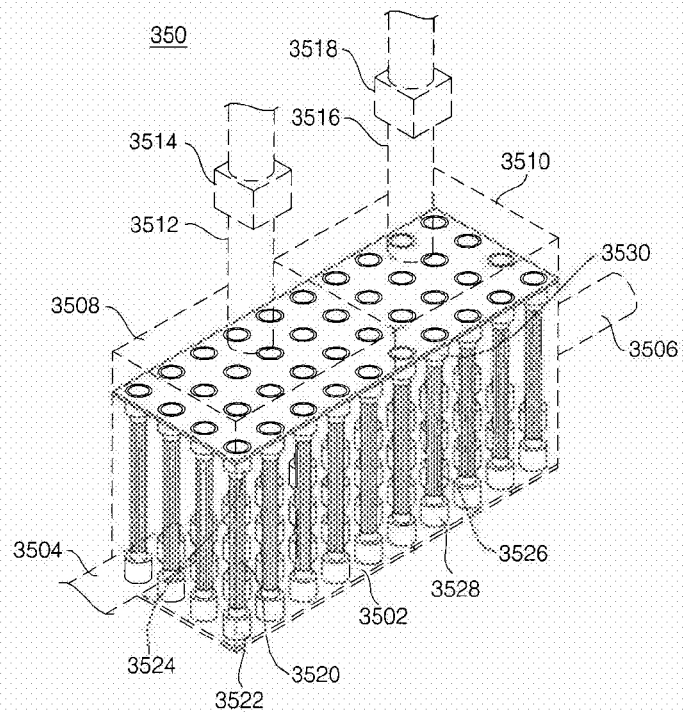
FIG. 3 is a perspective view of an exhaust gas treating apparatus for carbon dioxide capture process using separation membrane according to a first embodiment of the present invention.

In FIG. 3 the numeral 350 shows an exhaust gas treating apparatus for carbon dioxide capture process using the separation membrane according to a first embodiment of the present invention.

The basic concept of the exhaust gas treating apparatus 350 for carbon dioxide capture process is to minimize the pollutants in the exhaust gas introduced in the carbon dioxide capture process by applying negative-pressure to separation membrane modules 3520 and 3526 to separate NOx or $SO_2$ through selective absorption of harmful components in the exhaust gas through separation membrane modules 3520 and 3526.

For this, the exhaust gas treating apparatus 350 for carbon dioxide capture process includes a housing 3502 which has a space for exhaust gas to flow and on both sides of which are placed an exhaust gas inlet pipe 3504 and an exhaust gas outlet pipe 3506; negative-pressure chambers 3508 and 3510 in which are installed separation pipes 3512 and 3516 connected to the housing 3502 so as to provide a space isolated from the inner space of the housing 3502, respectively, and connected with a negative-pressure device (not shown); and a plurality of separation modules 3520 and 3526 fixed to the negative pressure chambers 3508 and 3510 by a plurality of Connectors 3522, 3524, 3528 and 3530 so as to communicate with the inside of the negative-pressure chambers 3508 and 3510.

The shape of the housing 3502 is not particularly limited, but is formed roughly in a hexagon in the first embodiment of the present invention. The housing 3502 has a space of a cross sectional area greater than the cross sectional area of the inlet pipe 3504 through which exhaust gas is introduced. Therefore, the flow rate of the exhaust gas is lowered to prolong the time of contact between exhaust gases and separation membrane modules 3520 and 3526.

In the housing 3502 are placed two negative-pressure chambers 3508 and 3510 having space isolated from the inner space of the housing 3502 in such a manner that they come into contact each other. In the first embodiment of the present invention, the negative-pressure chambers 3508 and 3510 are mounted on the housing 3502. In the negative-pressure chambers 3508 and 3510 are installed separation pipes 3512 and 3516 connected with a negative-pressure device (not shown) providing negative-pressure, and in the separation pipes 3512 and 3516 may be installed separation valves 3514 and 3518 for opening and closing.

Inside the negative-pressure chambers 3508 and 3510 are installed one or more upper connectors 3524 and 3530. The upper sides of the connectors 3524 and 3530 are communicated with the inner space of the negative-pressure chambers 3508 and 3510 and the lower sides of the connectors 3524 and 3530 are exposed to the inner space of the housing 3502. And at the bottom end of the connector 3524 are installed the membrane modules 3520 and 3526.

Accordingly, the upper sides of the separation modules 3520 and 3526 are fixed by the upper connectors 3524 and 3530 connecting to the negative-pressure chambers 3508 and 3510, and the lower sides of the separation modules 3520 and 3526 are fixed by the lower connectors 3522 and 3528 fixed on the floor surface of the housing 3502. The lower connectors 3522 and 3528 are used simply for fixing and are closed by the floor surface of the housing 3502. It is also possible to install negative-pressure chambers additionally in the bottom end portion of the housing 3502, and make the connectors 3522 and 3528 communicate with the additionally installed negative-pressure chambers.

The separation membrane modules 3520 and 3526 are made of a tubular bundle formed of polymer separation membrane having a space for the fluid to move therein.

The exhaust gases passing through the separation modules 3520 and 3526 are separated selectively according to the difference of permeability by gas composition due to vacuum pressure acting on the inside of the hollow fiber membrane by the operation of the negative-pressure device as they come into contact with the surface of the hollow fiber membrane of thousands of strands installed inside the modules. At this time, by regulating the permeability of the hollow fiber membrane, separation of $SO_2$ and $NO_2$ can be made sequentially in the reactor in which polymer separation membrane modules are installed.

The permeability of the hollow fiber membrane can be regulated according to the publicly known method of manufacturing hollow fiber membrane and specific description of it will be omitted. Therefore, it is possible to manufacture hollow fiber membranes by the publicly known manufacturing method in such a way that regulating the permeability of $SO_2$ and $NO_2$ is possible. For example, it is possible to manufacture hollow fiber membranes with the permeability different in $SO_2/CO$ and $NO_2/CO$ as in Table 1 excerpted from the related art (see J. Weichart, J. Mtiller, "Investigation of the concentration driven permeation of diluted $SO_2$, NO, and CO in silicon organic membranes prepared by plasma polymerization", *Journal of Membrane Science*, 86 (1994) 87-93).

TABLE 1

Results of separation experiments with mixtures of $SO_2/CO/N_2$ and $NO_2/CO/N_2$; permeation rate P* is given in $10^{-9}$ $m^3$ (STP)-$m^{-2}$-$sec^{-1}$-$Pa^{-1}$

| | Membrane | | | | |
|---|---|---|---|---|---|
| | A | B | C | D | E |
| Film thickness (μm) | 1.5 | 0.68 | 1.2 | 0.97 | 1.0 |
| 140 ppm $SO_2$/158 ppm CO in $N_2$ | | | | | |
| $SO_2$ | 1 | 2.7 | 3.7 | 2.6 | 5.5 |
| CO | $0.1^a$ | 0.23 | $0.1^a$ | $0.1^a$ | 0.58 |
| $SO_2/CO$ | $10^a$ | 12 | $37^a$ | $26^a$ | 9.6 |
| 92 ppm $SO_2$/315 ppm CO in $N_2$ | | | | | |
| $SO_2$ | | | 2.4 | | 4.3 |
| CO | | | 0.2 | | 0.71 |
| $SO_2/CO$ | | | 12 | | 6 |
| 158 ppm $NO_2$/158 ppm CO in $N_2$ | | | | | |
| $NO_2$ | 0.1 | 0.9 | 2.1 | 1.3 | 3.5 |
| CO | $0.1^a$ | $0.1^a$ | $0.1^a$ | 0.23 | 1.3 |
| $NO_2/CO$ | —$^a$ | $9^a$ | $21^a$ | 5.6 | 2.6 |

$^a$Uncertain separation factor values due to the limitation of the method.

In Table 1, separation membrane D may be selected to separate sulfur oxides and separation membrane C may be selected to separate nitrogen oxides. And they are placed in such a way that separation member D is positioned first with respect to the progress direction and separation membrane C is positioned after that. Through this, in separation membrane D whose permeability of $SO_2/CO$ is 26 and $NO_2/CO$ is 5.6, the permeability of $SO_2/CO$ is 4.6 times greater than $NO_2/CO$. Accordingly, since a relatively large quantity of sulfur oxides permeate through the hollow fiber membrane, it is possible to separate sulfur oxides contained in the exhaust gas. If separation C whose permeability of $SO_2/CO$ is 37 and $NO_2/CO$ is 21 is positioned after the separation of sulfur oxides is completed, sulfur oxides have already been separated even though the $SO_2/CO$ value is great, so it is possible to separate nitrogen oxides from the remaining exhaust gas by separation C whose permeability of $NO_2/CO$ value is great.

Like this, since the permeability of $SO_2$ and $NO_2$ becomes different according to the material of membrane or the manufacturing method, separation of $SO_2$ and $NO_2$ can be made sequentially.

For such a sequential separation, the negative-pressure chambers 3508 and 3510 are composed of a first negative-pressure chamber 3508 for separating sulfur dioxides and a second negative-pressure chamber 3510 for separating nitrogen oxides. And in the first negative-pressure chamber 3508 is installed a first separation pipe 3512 and in the second negative-pressure chamber 3510 is installed a second separation pipe 3516. The first negative-pressure chamber 3508 and the second negative-pressure chamber 3510 are placed sequentially along the flow direction of the exhaust gas flowing inside the housing 3502. And the first negative-pressure chamber 3508 is communicated with the first separation membrane module 3520 which is suitable for separating sulfur oxides, and the second negative-pressure chamber 3510 is communicated with the second separation membrane module 3526 which is suitable for separating nitrogen oxides.

As a result, by recovering the $NO_2$ separated from the second negative-pressure chamber 3510 to recycle it with a boiler 310, it is utilized to suppress the generation of NOx in the boiler 310. And by recovering $SO_2$ separated by the first negative-pressure chamber 3508 and supplying it to a sulfur manufacturing process, it is possible to manufacture marketable sulfur. $SO_2$ can also be utilized for manufacturing elemental sulfur according to the conditions of the process layout or the surrounding.

Figure 4:
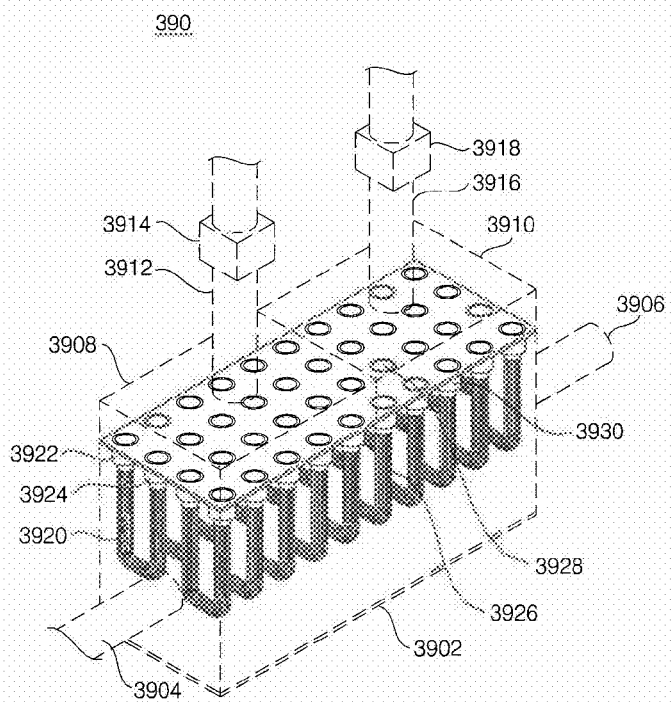
FIG. 4 is a perspective view of an exhaust gas treating apparatus for carbon dioxide capture process using separation membrane according to a second embodiment of the present invention.

FIG. 4 is a perspective view illustrating an exhaust gas treating apparatus 390 for carbon dioxide capture process using the separation membranes according to a second embodiment of the present invention.

The exhaust gas treating apparatus 390 for carbon dioxide capture process has a configuration basically identical to the exhaust gas treating apparatus 350 for carbon dioxide capture process, with the only difference in the installation type of separation membrane modules 3920 and 3926. Therefore, description of the rest of the components other than this difference will be omitted.

The separation membrane modules 3520 and 3526 of the first embodiment are installed on a straight line lengthily upward and downward. In contrast to this, the separation membrane modules 3920 and 3926 of the second embodiment are connected roughly in a U shape for both end portions to communicate with negative-pressure chambers 3908 and 3910. For this, both end portions of the separation membrane modules 3920 and 3926 are fixed to a plurality of connectors 3922, 3924, 3928 and 3930 installed in the negative-pressure chambers 3908 and 3910. Accordingly, connectors 3922, 3924, 3928 and 3930 of the same shape are installed in the negative-pressure chambers 3908 and 3910 and extra connectors are not installed on the floor of the housing 3902, so the exhaust gas treating apparatus 390 for carbon dioxide capture process of the second embodiment has an advantage that installation work is easy compared with the exhaust gas treating apparatus 350 for carbon dioxide capture process of the first embodiment.

Figure 5:
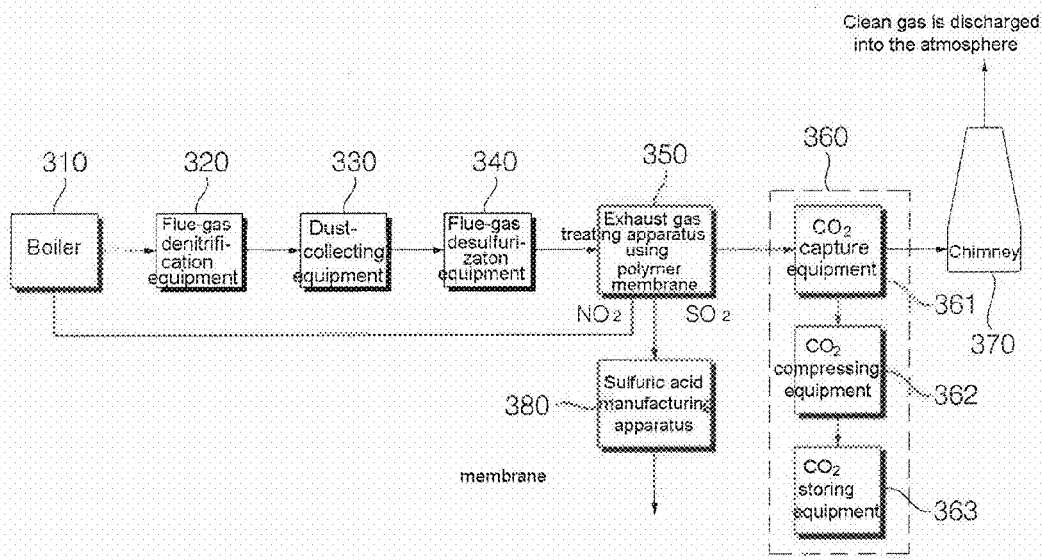
FIG. 5 is a block diagram showing the configuration of an exhaust gas treating system for coal burning thermal power plant using the exhaust gas treating apparatus for the carbon dioxide capture process using the separation membrane of FIG. 3.

The exhaust gas treating apparatuses 350 and 390 for carbon dioxide capture process according to the embodiments of the present invention are composed basically in the manner as described above. The exhaust gas treating apparatuses 350 and 390 for carbon dioxide capture process illustrated in FIG. 3 and FIG. 4 show only schematic structures for description of the processes according to the present invention, and the layout and composition of the actual separation membrane modules may have various shapes and structures according to the characteristics of the process or conditions of operational space, etc. Below will be described an exhaust gas treating system 300 that applies the exhaust gas treating apparatus 350 for carbon dioxide capture process with reference to FIG. 5 and FIG. 6.

The exhaust gas treating system 300 includes the boiler 310, flue-gas denitrification equipment 320, dust-collecting equipment 330 and flue-gas desulfurization equipment 340, polymer separation membrane type exhaust gas treating apparatuses 350 and 390, and a carbon dioxide capture equipment 360.

The present invention is characterized by additionally providing the above-mentioned polymer separation membrane type exhaust gas treating apparatus 350 between the flue-gas desulfurization equipment 340 and the carbon dioxide capture equipment 360 that have been used in the related art. On the other hand, the flue-gas denitrification equipment 320, dust-collecting equipment 330, flue-gas desulfurization equipment 340 and carbon dioxide capture equipment 360 are of the same composition as the conventional system, so a detailed description of them will be omitted.

In the polymer separation membrane type exhaust gas treating apparatus 350 occurs the flow of harmful substances as described above besides the flow of exhaust gas. The flow of exhaust gas occurs in the sequence of the exhaust gas inlet pipe 3504, the space in the housing 3502 and the exhaust gas outlet pipe 3506. And the movement of pollutants separated from the exhaust gases occurs in the sequence of the space in the housing 3502, separation membrane modules 3520 and 3526, negative-pressure chambers 3508 and 3510, and separation pipes 3512 and 3516. Accordingly, especially by the difference in permeability between the first separation membrane module 3520 and the second separation membrane module 3526, sulfur oxides are collected in the first negative-pressure chamber 3508 and nitrogen oxides are collected in the second negative-pressure chamber 3510. Namely, the pollutants selectively separated from the exhaust gases flowing in the housing 3502 are introduced into the negative-pressure chambers 3508 and 3510.

Separation of $SO_2$ and $NO_2$ is sequentially made in the separation membrane modules 3508 and 3510, and $NO_2$ separated to the first negative-pressure chamber 3508 through the first separation membrane module 3520 is collected and recycled to the boiler 310. Therefore, it can be utilized in suppressing the generation of NOx in the boiler 310.

And by recovering $SO_2$ separated by the second separation membrane module 3526 and collected in the second negative-pressure chamber 3510 and supplying it to a sulfuric acid manufacturing apparatus 380 for sulfur manufacturing process, it is possible to manufacture marketable sulfur. According to the conditions of installation or the surroundings, the recovered $SO_2$ can also be utilized in manufacturing elemental sulfur.

Since the exhaust gases that have passed through the polymer separation membrane type exhaust gas treating apparatus 350 maintain pollutants at or below a proper level, they prevent degradation of the absorbent used in the carbon dioxide capture process, so the absorption performance can be improved. Finally, it has an advantage that it can prevent the pollution of the exhaust gases discharged into the atmosphere.

Figure 6:
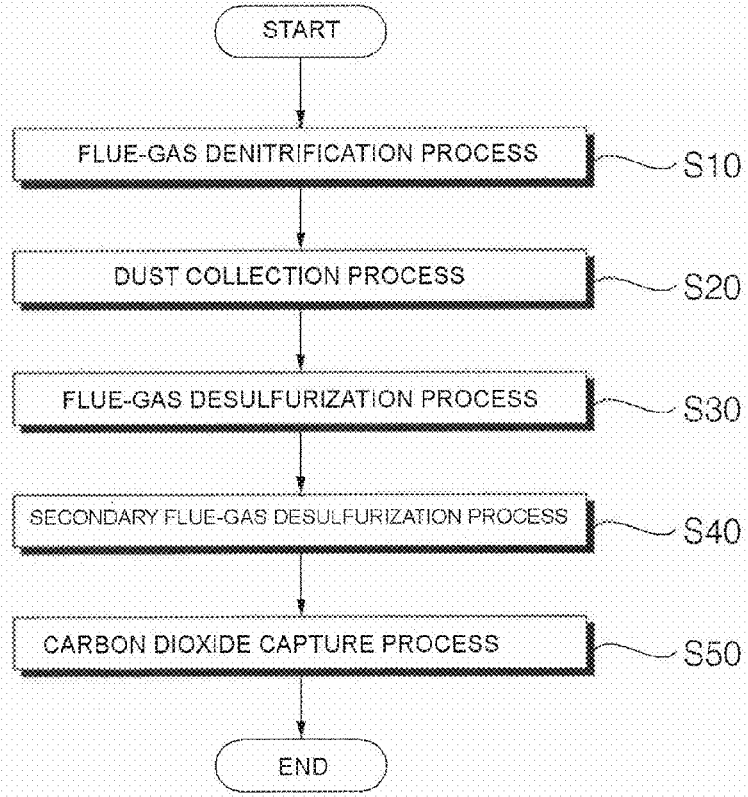
FIG. 6 is a flow chart showing the process of the exhaust gas treating method for carbon dioxide capture process in the exhaust gas treating system for coal burning thermal power of FIG. 5.

With reference to FIG. 6, the process sequence of an exhaust gas treating system that applies the polymer separation membrane type exhaust gas treating apparatus 350 according to the first embodiment of the present invention will be described.

The exhaust gas treating method 390 for carbon dioxide capture process includes a flue-gas denitrification process (S10) for removing nitrogen oxides in exhaust gas, a dust collection process (S20) for removing PM in exhaust gas, a flue-gas desulfurization process (S30) for removing sulfur oxides in exhaust gas, a secondary flue-gas desulfurization process (S40) for removing pollutants in exhaust gas secondarily, and a carbon dioxide capture process (S50). Since the flue-gas denitrification process (S10), dust collection process (S20), the flue-gas desulfurization process (S30) and the carbon dioxide capture process (S50) are of the same configuration as the conventional method, so a detailed description of them will be omitted.

The polymer separation membrane type exhaust gas treating apparatuses 350 and 390 are applied to the secondary flue-gas desulfurization process (S40). It is possible to improve the cleanliness of the gases introduced into the carbon dioxide capture process (S50) by separating harmful gas components such as sulfur oxides and $NO_2$ remaining in the gases discharged through this.

While the present invention has been described with reference to some exemplary embodiments, it will be understood by those skilled in the related art that various modifications and variations may be made therein without departing from the scope of the present invention as defined by the appended claims.

What is claimed is:

1. An exhaust gas treating system using polymer membrane, comprising a carbon dioxide capture equipment for capturing carbon dioxide from the exhaust gas of a boiler, a flue-gas denitrification equipment placed between the boiler and the carbon dioxide capture equipment, a dust-collecting equipment and a flue-gas desulfurization equipment, wherein the carbon dioxide capture equipment includes an exhaust gas treating apparatus for carbon dioxide capture which is installed at the front end thereof, and the exhaust gas treating apparatus for carbon dioxide capture comprises a housing which has a space for exhaust gas to flow and on both sides of which are placed an exhaust gas inlet pipe and an exhaust gas outlet pipe;

negative-pressure chambers which are connected to the housing so as to provide an inner space and isolated space of the housing and in which separation pipes connected to negative-pressure devices are installed; and a plurality of separation membrane modules installed inside the housing so that one end portion or both end portions thereof are connected to the inside of the negative-pressure chamber.

2. The system of claim 1, wherein the negative-pressure chambers are composed of a first negative-pressure chamber for separating sulfur oxides and a second negative-pressure chamber for separating nitrogen oxides, wherein the first negative-pressure chamber and second negative-pressure chamber are placed sequentially with respect to the flow direction of the exhaust gas in the housing, and the first negative-pressure chamber and the second negative-pressure chamber are include a first separation pipe and a second separation pipe to communicate therewith, respectively, and a first separation membrane module and a second separation module communicated respectively with the first negative-pressure chamber and the second negative-pressure chamber have mutually different permeability, so that sulfur oxides and nitrogen oxides are separated sequentially from the exhaust gas passing through the housing.

3. The system of claim 2, wherein the sulfur oxides separated from the first negative-pressure chamber are supplied to a sulfur manufacturing apparatus.

4. The system of claim 1, wherein the nitrogen oxides separated from the second negative-pressure chamber are fed back to the boiler.

5. The system of claim 1, wherein one end portion of the separation membrane module is fixed by a connector installed so as to be communicated with the negative-pressure chamber, and the other end portion of the separation membrane module is fixed to a connector installed on the floor surface of the housing.

6. The system of claim 1, wherein both end portions of the separation membrane module are fixed by connectors installed so as to be communicated with the negative-pressure chamber.

* * * * *